US011552389B2

United States Patent
Harrer (10) Patent No.: US 11,552,389 B2
(45) Date of Patent: Jan. 10, 2023

(54) RADAR APPARATUS, METHOD OF MANUFACTURING A RADAR APPARATUS AND MOTOR VEHICLE

(71) Applicant: Brose Fahrzeugteile SE & Co. Kommanditgesellschaft, Bamberg, Bamberg (DE)

(72) Inventor: Stephan Harrer, Bamberg (DE)

(73) Assignee: Brose Fahrzeugteile SE & Co. Kommanditgesellschaft, Bamberg, Bamberg (DE)

( * ) Notice: Subject to any disclaimer, the term of this patent is extended or adjusted under 35 U.S.C. 154(b) by 115 days.

(21) Appl. No.: 16/838,147

(22) Filed: Apr. 2, 2020

(65) Prior Publication Data

US 2020/0321694 A1 Oct. 8, 2020

(30) Foreign Application Priority Data

Apr. 2, 2019 (DE) .................... 10 2019 204 700.9

(51) Int. Cl.
*H01Q 1/42* (2006.01)
*H01Q 1/32* (2006.01)
*G01S 13/931* (2020.01)
*G01S 7/03* (2006.01)

(52) U.S. Cl.
CPC .............. *H01Q 1/42* (2013.01); *G01S 7/03* (2013.01); *G01S 13/931* (2013.01); *H01Q 1/3233* (2013.01)

(58) Field of Classification Search
CPC ........ G01S 13/931; H01Q 1/42; H01Q 1/422; H01Q 1/424
See application file for complete search history.

(56) References Cited

U.S. PATENT DOCUMENTS

| 6,111,551 A * | 8/2000 | Schmidt | H01Q 17/008 428/920 |
| 6,184,842 B1 * | 2/2001 | Leinweber | B60R 13/005 156/60 |
| 10,367,258 B2 * | 7/2019 | Tagi | H01Q 1/42 |
| 2004/0036645 A1 * | 2/2004 | Fujieda | H01Q 1/421 342/72 |
| 2005/0001757 A1 * | 1/2005 | Shinoda | H01Q 1/42 342/70 |
| 2005/0105075 A1 * | 5/2005 | Gottwald | G01S 7/032 356/28 |
| 2006/0290564 A1 * | 12/2006 | Sasada | G01S 13/931 342/107 |

(Continued)

FOREIGN PATENT DOCUMENTS

| CN | 108037500 A | 5/2018 |
| DE | 19850639 A1 | 5/1999 |

(Continued)

*Primary Examiner* — Peter M Bythrow
(74) *Attorney, Agent, or Firm* — Brooks Kushman P.C.

(57) ABSTRACT

A radar apparatus for a motor vehicle including a transceiver device configured to transmit radar radiation and to receive the radar radiation reflected from objects in an environment of the radar apparatus and to generate a measurement signal, and a protection device configured to protect the transceiver device from external influences. The thickness of the protective device is at least in sections less than 10% of a wavelength of the radar radiation passing through the protective device.

13 Claims, 4 Drawing Sheets

(56) References Cited

U.S. PATENT DOCUMENTS

| | | | |
|---|---|---|---|
| 2007/0013581 A1* | 1/2007 | Iijima | G01S 7/032 |
| | | | 257/E23.114 |
| 2007/0159380 A1* | 7/2007 | Nagaishi | G01S 13/931 |
| | | | 257/E25.031 |
| 2007/0241962 A1* | 10/2007 | Shinoda | H01Q 1/425 |
| | | | 342/361 |
| 2008/0252552 A1* | 10/2008 | Goebel | H01Q 21/062 |
| | | | 343/872 |
| 2012/0268344 A1* | 10/2012 | McCarthy | H01Q 21/0093 |
| | | | 343/893 |
| 2013/0050034 A1 | 2/2013 | Wu et al. | |
| 2015/0084803 A1* | 3/2015 | Purden | H01Q 17/00 |
| | | | 342/385 |
| 2016/0231417 A1* | 8/2016 | Aoki | H01Q 15/0013 |
| 2016/0344095 A1* | 11/2016 | Tagi | H01Q 15/02 |
| 2017/0207514 A1 | 7/2017 | Kamo | |
| 2017/0285163 A1* | 10/2017 | Rieke | H01Q 17/00 |
| 2018/0159211 A1* | 6/2018 | Biancotto | H01Q 21/06 |
| 2018/0241119 A1* | 8/2018 | Hawthorne | H01Q 1/422 |
| 2018/0319138 A1* | 11/2018 | Ukei | B32B 27/30 |
| 2019/0190140 A1* | 6/2019 | Lavin | H01Q 1/422 |
| 2019/0207302 A1* | 7/2019 | Yamada | G01S 7/027 |
| 2019/0265329 A1* | 8/2019 | Mauch | G01S 7/032 |
| 2020/0295452 A1* | 9/2020 | Yamada | H01Q 1/422 |
| 2021/0063529 A1* | 3/2021 | Schulte | G01S 13/931 |
| 2021/0159592 A1* | 5/2021 | Kawashima | H01Q 1/422 |

FOREIGN PATENT DOCUMENTS

| | | |
|---|---|---|
| DE | 19819709 A1 | 11/1999 |
| DE | 19819709 C2 | 5/2000 |
| DE | 10026454 C1 | 12/2001 |
| DE | 10338506 A1 | 10/2004 |
| DE | 10354945 A1 | 7/2005 |
| DE | 102006004874 A1 | 8/2007 |
| DE | 102007059758 A1 | 6/2009 |
| DE | 102007062945 A1 | 6/2009 |
| DE | 102010049820 A1 | 5/2012 |
| DE | 102012018328 A1 | 3/2014 |
| DE | 102013207482 A1 | 10/2014 |
| DE | 102013022061 A1 | 6/2015 |
| DE | 102014002438 A1 | 8/2015 |
| DE | 102014213502 A1 | 1/2016 |
| DE | 102015217012 A1 | 3/2016 |
| DE | 102015218981 A1 | 3/2016 |
| DE | 102016009549 A1 | 3/2017 |
| DE | 102016101007 A1 | 7/2017 |
| DE | 102017104670 A1 | 9/2017 |
| EP | 1308747 A2 | 5/2003 |
| EP | 2311137 A2 | 4/2011 |
| JP | 2013102512 A | 5/2013 |
| WO | 2007047002 A2 | 4/2007 |
| WO | 2013177756 A1 | 12/2013 |
| WO | 2014073108 A1 | 5/2014 |
| WO | 2017026209 A1 | 2/2017 |
| WO | 2017192330 A1 | 11/2017 |
| WO | 2018077827 A1 | 5/2018 |

* cited by examiner

RADAR APPARATUS, METHOD OF MANUFACTURING A RADAR APPARATUS AND MOTOR VEHICLE

CROSS-REFERENCE TO RELATED APPLICATIONS

This application claims priority to German Patent Application No. DE 10 2019 204 700.9, filed on Apr. 2, 2019, the disclosure of which is hereby incorporated in its entirety by reference herein.

TECHNICAL FIELD

The present invention refers to a radar apparatus for a motor vehicle, a method for manufacturing a radar apparatus for a motor vehicle and a motor vehicle.

BACKGROUND

Modern motor vehicles are provided with a multitude of sensors to detect the vehicle's environment. Based on the sensor data generated, driver assistance systems may support the driver or steer the vehicle partially or completely autonomously. Radar sensors may be used to calculate distances and relative speeds. These sensors are usually located at the front or rear of the vehicle, especially in the area of the bumper or behind the radiator grille. Radar sensors comprise antenna elements for generating electromagnetic radar radiation as well as electronics that control the antenna elements. Since these components may easily be damaged by external environmental influences, it is necessary to design a protective device that prevents the components from being directly exposed to the environment. Such a protective device is referred to as a radome and is preferably configured to blend in with the external appearance of the vehicle.

SUMMARY

One or more objects of the present disclosure may be to provide a radar apparatus that may reduce losses of radar radiation through the radome during transmission of radar radiation.

According to a first embodiment, the present provides a radar apparatus for a motor vehicle, which may include a transceiver device and a protective device, i.e. a radome. The transceiver device is configured to transmit radar radiation and to receive the radar radiation reflected from objects in an environment of the radar apparatus. The transceiver device generates a measurement signal on the basis of the received radar radiation. The protective device is configured to protect the transceiver device from external mechanical or chemical influences. The thickness of the protective device is selected such that it is less than 10% of the wavelength of the radar radiation passing through the protective device.

According to a second embodiment, a method of manufacturing a radar apparatus is provided. A transceiver device may be provided that may be configured to emit radar radiation, to receive the radar radiation reflected from objects and to generate a measurement signal. A protective device is provided which protects the transceiver device from external influences. The thickness of the protective device may, at least in sections, less than 10% of a wavelength of the radar radiation passing through the protective device.

According to a third embodiment, the present disclosure includes a motor vehicle that may be provided with at least one radar apparatus.

In one or more embodiments, the radar transmitter may include electromagnetically thin materials as a protective device, i.e. the thickness of the protective device may be less than 10% of the wavelength of the radar radiation to be emitted. The transceiver device may be configured to transmit radar radiation at a predetermined frequency or in a predetermined frequency range. The frequency corresponds to a wavelength of the radar radiation, which may be dependent on the propagation medium. The wavelength is always the wavelength of the radar radiation within the protective device, i.e. when the radar radiation passes through the protective device.

The benefit of using electromagnetically thin materials may be due to the fact that they are substantially transparent to the corresponding electromagnetic radiation. The transmission of the radar radiation through the protective device may thus be performed substantially without loss due to the use of the thin protective device, since the dielectric losses are negligible.

A further benefit may be that mechanical tolerances may also be neglected when using electromagnetically thin materials as a protective device. Such mechanical tolerances may arise, for example, due to variations in the distance between a circuit board of the transceiver device and the protective device, a thickness of the circuit board of the transceiver device and a thickness of the protective device.

Similarly, tolerances in material composition when using electromagnetically thin materials do not show a significant effect on the transmission of radar radiation. The reduction of this influence allows reducing the requirements in the production process, making the production process faster and cheaper.

Finally, material costs may be reduced by using electromagnetically thin materials as protective devices.

Finally, when using electromagnetically thin materials as a protective device, materials may also be applied whose properties in the high-frequency range would lead to high dielectric losses at greater thicknesses. This facilitates the use of a wider range of materials.

In accordance with one or more embodiments of the radar apparatus, the transceiver device may be an un-modulated continuous wave radar (CW radar), i.e., configured to transmit radar radiation with constant amplitude and constant frequency. The frequency may be 24 GHz or 77 GHz, for example. Such a radar apparatus may be configured to measure speed, distance or range.

According to another embodiment of the radar apparatus, the transceiver device may be a modulated continuous wave radar. As an example, the transceiver device may be a frequency modulated continuous wave radar (FMCW radar). In this case, the frequency may be modulated periodically, and the modulation may be linear with respect to time. Depending on the evaluation method, distances and/or speeds may be measured.

In accordance with one or more embodiments of the present disclosure, the transceiver device may be configured to transmit radar radiation at a frequency of 77 GHz or to transmit in a frequency range around 77 GHz, approximately between 75 GHz and 85 GHz or such as in a frequency range between 77 GHz and 81 GHz. The wavelength of the radar radiation in a protective device having a typical permittivity of 2 is approximately 2.75 millimeters. The thickness of the protective device may be selected in such a way that it is less than 0.275 millimeters, at least in sections. As an example, the thickness of the protective device may be less than 0.275 millimeters. In accordance with other embodiments, the thickness of the protective device may be less than 0.2 millimeter or less than 0.15 millimeter at least in sections. Furthermore, the transceiver device may be operated as a CW radar as described above, at a frequency of 77 GHz. The transceiver device may also be configured to be an FMCW radar as described above. In this case the transceiver device is configured to transmit radar radiation in a frequency range around 77 GHz. The frequency of 77 GHz serves as the carrier frequency.

In one or more embodiments, the transceiver device may be configured to transmit radar radiation at a frequency of 24 GHz or to transmit in a frequency range around 24 GHz, approximately between 21.65 GHz and 26.65 GHz. The wavelength of the radar radiation in a protective device having a typical permittivity of 2 is about 8.82 millimeters. The thickness of the protective device is therefore selected such that it is less than 0.882 millimeters, at least in sections.

In accordance with another embodiment, the thickness of the protective device may be selected to be at least partially less than 0.2 millimeters, less than 0.1 millimeters or less than 0.05 millimeters.

In one or more embodiments, the protective device may be formed of a material that is at least partially electrically non-conductive material. As an example, the protective device may consist at least partially of a plastic material. As another example, the protective device may consist entirely of a plastic material. However, the protective device may also be made only partially of plastic material and may contain additional components, such as thin coatings. The plastic materials used for the protective device may comprise at least one of polyolefins such as polyethylene (PE), acrylonitrile-butadiene-styrene copolymers (ABS), polyethylene terephthalate (PET), polyvinyl chloride (PVC), polystyrene (PS), polyester and polycarbonate (PC).

In accordance with another exemplary embodiment, the radar apparatus may include a housing, and the transceiver device may be arranged in the housing. The housing may also only partially enclose the transceiver device, for example in the form of a lower housing shell. The protective device may be mounted to the housing. As an example, the transceiver device may be arranged on a printed circuit board which is inserted into the housing. The printed circuit board may be coupled to the housing by means of thermal interface material (TIM), such that heat generated during operation of the transceiver device may be dissipated by means of the housing. The transceiver device may comprise antenna elements and a radar chip, with the radar chip thermally coupled to the housing by means of the thermal interface material.

According to another exemplary embodiment, the housing may at least partially made of plastic material. The protective device is bonded or welded to the housing. It is also possible to couple the protective device to the housing by means of other known coupling processes. The use of foils, which are bonded or welded, is considerably less cost intensive in production than the use of plastic injection molded parts, both in terms of material costs and process costs. In addition, welding processes are extremely stable, and welding systems in series production require little maintenance.

As another example, the housing may be at least be partly formed of a metal material. The protective device may be bonded to the housing. A metal housing may be advantageous in order to provide more efficient heat dissipation.

According to another embodiment, the protective device may be attached to the housing in such a way that the transceiver device is enclosed in the housing in an airtight manner. The protection device may provide good protection for the transceiver device against particles or fluids such as gases, lubricants or water.

In one or more embodiments, the protective device may include at least one foil, which is positioned in the beam path of the transceiver device. The beam path is understood to be the solid angle range in which the radar radiation is emitted. For example, the protective device may comprise exactly one foil which protects the transceiver device. However, the protective device may also comprise several foils, the total thickness of the foils being electromagnetically thin, i.e. less than 10% of the wavelength of the radar radiation passing through the foils.

In case different materials are used, the wavelength of the radar radiation may differ with respect to the different materials. In this case, the thickness of the protective device may be selected such that it is less than 10% of the smallest of these wavelengths.

In one or more embodiments, the protective device may include at least one protective coating. For example, the protective device may include one or more foils, and the foils are provided with the at least one protective coating on a side facing away from the transceiver device, i.e. a side which is exposed to environmental influences after the installation of the radar apparatus on the motor vehicle. For example, the protective coating may consist partly or fully of $SiO_2$, and a certain resistance to scratches may be achieved. The overall design of the protective device is such that the thickness including the protective coating is less than 10% of the wavelength of the radar radiation passing through the protective device.

In one or more embodiments, the thickness of the protective device is at least partially less than 9%, 8%, 7%, 6% or 5% of the wavelength of the radar radiation passing through the protective device. The smaller the selected thickness, the lower are the possible dielectric losses of the radar radiation when passing through the protective device. As an example, even radar radiation emitted at an angle or portions of the radar beams that do not hit the protective device perpendicularly pass through an electromagnetically thin material such that losses may be neglected.

In one or more embodiments, the thickness of the protective device is selected in such a way that the distance covered by the radar radiation when passing through the protective device is less than 10% of the wavelength of the radar radiation passing through the protective device. As an example, the thickness of the protective device may thus be selected such that even if radar radiation is emitted at an angle such that it does not strike the protective device perpendicularly, the radar radiation passes through an electromagnetically thin material such that the losses are negligible. An oblique emission of radar radiation may occur, for example, when using phased array antennas as transceiver devices. In this case, the thickness of the protective device is selected in such a way that, for any given possible direction of transmission, the distance which the radar radiation travels when passing through the protective device is less than 10% of the wavelength of the radar radiation passing through the protective device.

In yet another embodiment, a method of manufacturing the radar apparatus is provided. The method may include providing a housing and the transceiver device may be accommodated in the housing. The protective device may be attached to the housing.

As an example, the housing is at least partially made of plastic material. The protective device is bonded or welded to the housing.

As an example, the protective device is attached to the housing in such a way to enclose the transceiver device in the housing in an airtight manner.

The protective device may include at least one foil which is positioned in the beam path of the transceiver device.

As an example, at least one protective coating is formed when the protective device is provided. The protective coating may be made of $SiO_2$, for example, and may be applied by means of sol-gel technology or chemical vapor deposition on a foil of the protective device.

BRIEF DESCRIPTION OF THE DRAWINGS

The present invention is explained in more detail below on the basis of the exemplary embodiments shown in the figures, wherein.

The enclosed figures are intended to provide a further understanding of the embodiments of the present invention. They illustrate embodiments and serve in connection with the description to explain the principles and concepts of the present invention. Further embodiments and many of the benefits mentioned above result when taken in combination with the figures. The elements shown in the figures are not necessarily drawn to scale.

In the figures of the drawing, like elements, features and components, which are identical in function and provide the same effect, are each indicated by the same reference signs, unless otherwise stated.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

A radome typically consists of one or more layers and may include a layer of paint corresponding to the color of the vehicle. In order to be able to use radomes with irregular surfaces, e.g. in the form of emblems or characteristic structures, document DE 19819709 A1 discloses the use of a cover plate that is transparent to radar and visual inspection, in which the emblem or structure is embedded in its negative form. This form is provided with a metallic or metallically shiny layer, the thickness of which is such that, in the visible wavelength range, the electromagnetic radiation is completely reflected and radar waves may pass through substantially unattenuated.

While the radome may be required for protection against external environmental influences, it must also be ensured that radar radiation is allowed to pass through the radome with as little loss as possible. Possible losses in the transmission path are caused by dielectric losses in the radome, by reflections of the radar radiation at the air/radome interface, which faces the antenna device, and by reflections of the radar radiation at the air/radome interface of the radome, which faces the ambient air. Furthermore, a mismatch of the wave impedance may occur if mechanical tolerances or fluctuating material properties may not be fully taken into account.

The thickness of the radome is typically chosen to be a multiple of half the wavelength of the radar radiation passing through the radome. The radome is thus typically several millimeters thick, which causes losses in the radome that may not be ignored.

Figure 1:
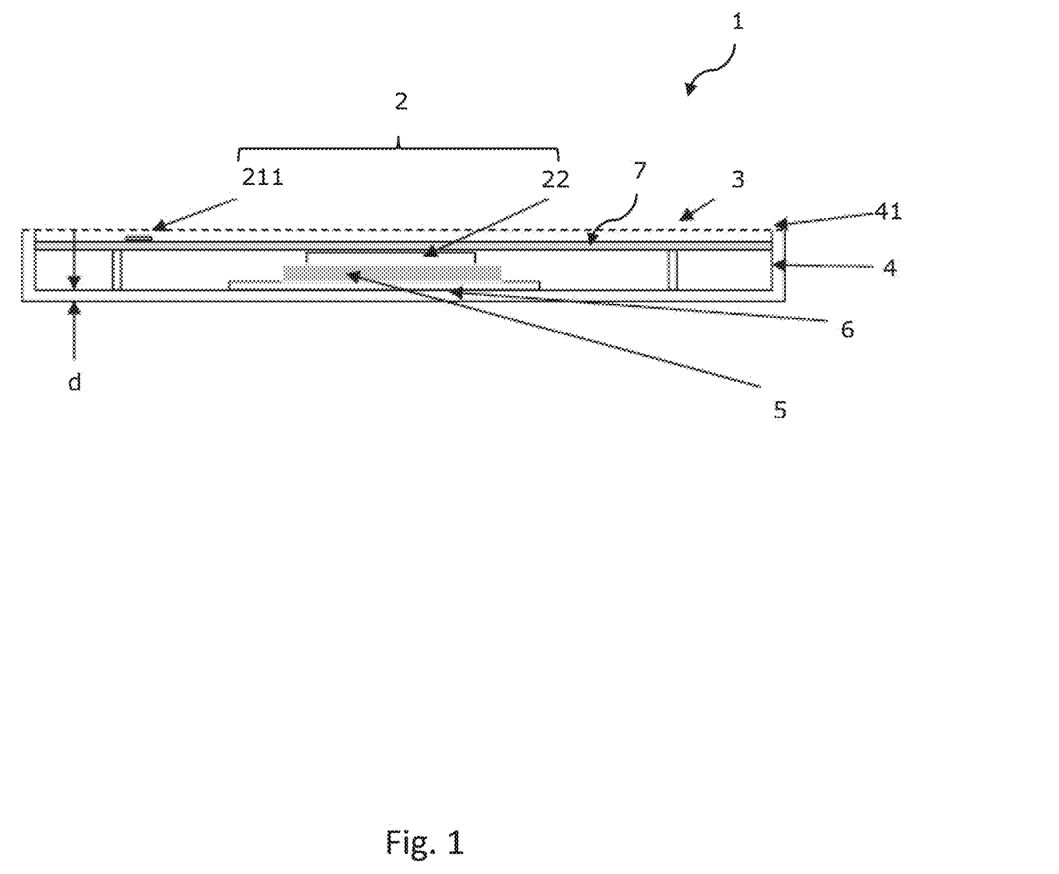
FIG. 1 shows a schematic cross-sectional view of a radar apparatus for a motor vehicle according to an embodiment of the present disclosure.
Figure 2:
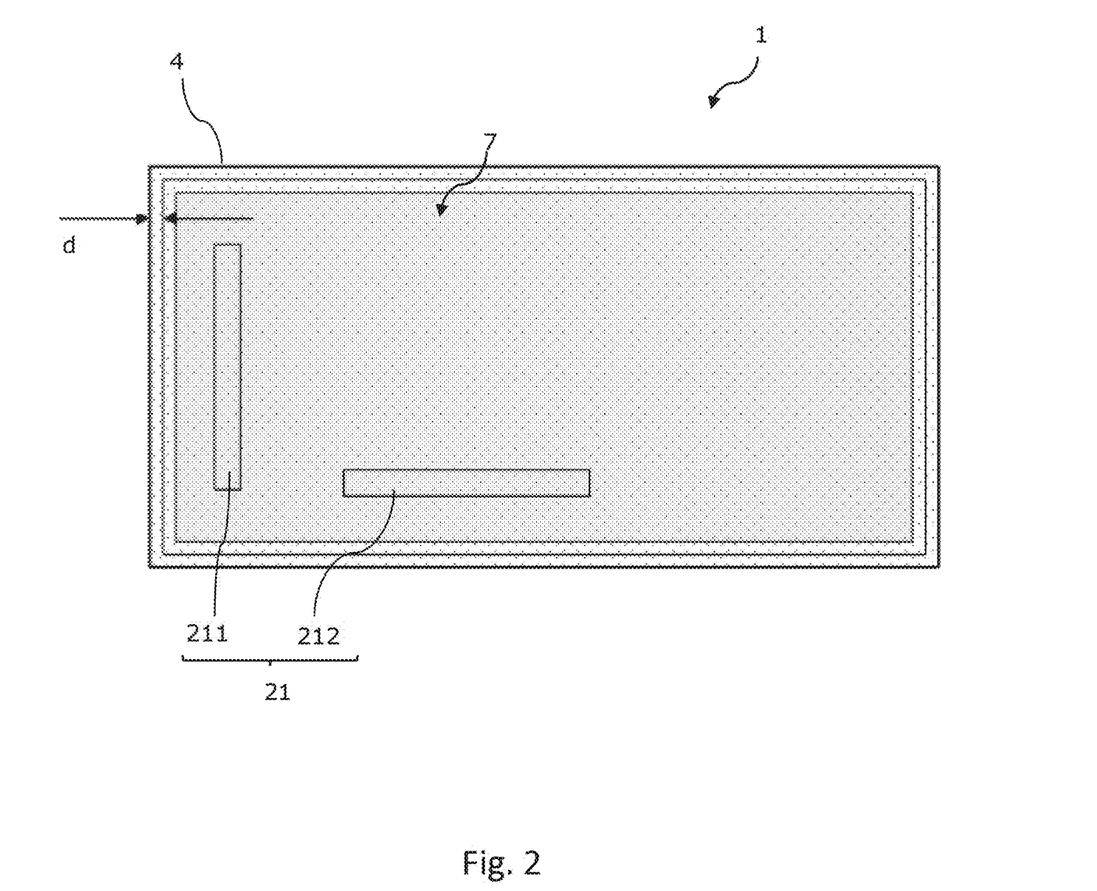
FIG. 2 shows a schematic plan view of the radar apparatus for a motor vehicle.

FIG. 1 shows a schematic cross-sectional view of a radar apparatus 1 for a motor vehicle. FIG. 2 shows a schematic top view of radar apparatus 1. Radar apparatus 1 may be configured to be arranged in a front, rear or side area of the motor vehicle. The radar apparatus 1 may include a transceiver device 2 that may be provided with antenna arrays 21 and a radar chip 22, which are electrically coupled to each other. The radar chip 22 may include electronic components which are configured to control the antenna arrays 21. The radar chip 22 and the antenna arrays 21 are mounted on a common circuit board 7. The antenna arrays 21, the radar chip 22 and the circuit board 7 may be configured to be an integrated circuit. The antenna arrays 21 may include a first antenna array 211 and a second antenna array 212, which may be aligned differently. As an example, the first and second antenna arrays 211, 212 may extend along axes which are orthogonal to each other, which allow determination of an angle of an object to be detected.

However, the present invention is not limited to the number or arrangement of antenna arrays 21 shown. For example, a single antenna array or a plurality of three or more antenna arrays may be provided.

The antenna arrays 21 are configured to transmit continuous (CW) phase-coded radar radiation at a frequency of 77 GHZ in their main beam direction. The frequency may also be of a different value, about 24 GHz, according to other embodiments. The antenna arrays 21 may also be controlled by the radar chip 22 using another method, such as an FMCW method, and the carrier frequencies may be in the range around 24 GHz or in the range around 77 GHz.

The emitted radar radiation is reflected at one or more objects in the vicinity of radar apparatus 1 and the reflected radar radiation is detected by means of antenna arrays 21. An electrical signal is transmitted to the radar chip 22 by means of the electrical connections, and an electronic evaluation means of the radar chip 22 generates a measurement signal depending on the electrical signal. The radar chip 22 may additionally be configured to perform a characterization of the object or objects using the measurement signal, i.e. such as to determine a relative speed of the object or objects, a distance of the object or objects or an angular position of the object or objects. Such an evaluation may also be performed in an external evaluation unit which is electrically coupled to the radar chip 22 but is not part of the radar apparatus 1. Such an external evaluation unit may be connected to any number of radar apparatuses 1.

The radar chip 22 is coupled to a cooling element 6 by means of a thermally conductive element 5 made of a thermal interface material (TIM), such that heat generated during operation of the radar chip 22 is transferred to a housing 4 of the radar apparatus 1 by means of the thermally conductive element 5 and the cooling element 6.

In the housing 4, the printed circuit board 7 is fixed and an air gap is formed between the printed circuit board 7 and the housing 4 in a direction perpendicular to the surface of the printed circuit board 7.

The housing 4 may, for example, have a thickness d of 2 millimeters; however the present disclosure is not limited thereto. The housing 4 may be made of metal or of plastic, but may also include different components, which may be partly made of metal and partly of plastic.

The radar apparatus 1 may be provided with a protective device 3 or a radome, that may be formed of a thin foil and to protect the transceiver device 2, i.e. the antenna arrays 21 of the transceiver device 2. The protective device 3 is non-transparent in the optical wavelength range such that the transceiver device 2 is not visible from the outside. In order to ensure that the radar apparatus 1 matches the external appearance of the motor vehicle, the protective device 3 may be configured to have a color matching the color of the motor vehicle, at least on one external surface. For this purpose, the protective device 3 may have a thin layer of paint.

The protective device 3 consists at least partially of an electrically non-conductive material, such as a plastic material. For this purpose, the protective device 3 may have one or more layers, which may be made of different materials, for example, different plastic materials.

As an example, the protective device 3 may be formed of a thin foil or of a combination of several such thin foils. The total thickness of protective device 3 is less than 10% of the wavelength of the radar radiation passing through protective device 3, i.e. the wavelength of the radar radiation within the protective device 3. As an example, the thickness of protective device 3 over the entire surface area of protective device 3 may be less than 10% of the wavelength of the radar radiation passing through protective device 3. However, the thickness of protective device 3 may also be less than 10% of the wavelength of the radar radiation passing through protective device 3 in one or more partial areas only, i.e. for example in an area above the antenna arrays 21. Outside of these partial areas, the thickness may be greater.

The thickness of the protective device 3 may also be selected to be less than 5% of the wavelength of the radar radiation passing through protective device 3. In addition, the antenna arrays 21 may be configured to emit radar radiation at a specified transmission angle, which is measured relative to the surface of the printed circuit board 7 and may differ from a 90-degree angle. The thickness of the protective device 3 may be selected in such a way that the distance which the radar radiation travels through the protective device 3, which thus depends on the transmission angle, is less than 10% of the wavelength of the radar radiation passing through the protective device 3.

As an example, the transceiver device 2 may transmit radar radiation at a frequency of 77 GHz. The permeability of the material of protective device 3 may have a value of 2. In this case, the thickness of protective device 3 may be selected to be less than 0.275 millimeter.

The protective device 3 is coupled to the housing 4 in an edge area 41 of the housing 4. The housing 4 may be made of metal at least in the edge area 41. The protective device 3 may be bonded to the housing 4.

Furthermore, the housing 4 may be made of plastic material at least in the edge area 41. The protective device 3 may be bonded or welded to the housing 4.

The protective device 3 may be coupled to the housing 4 in such a way that housing 4 and protective device 3 enclose the transceiver device 2 in an airtight manner.

Figure 3:
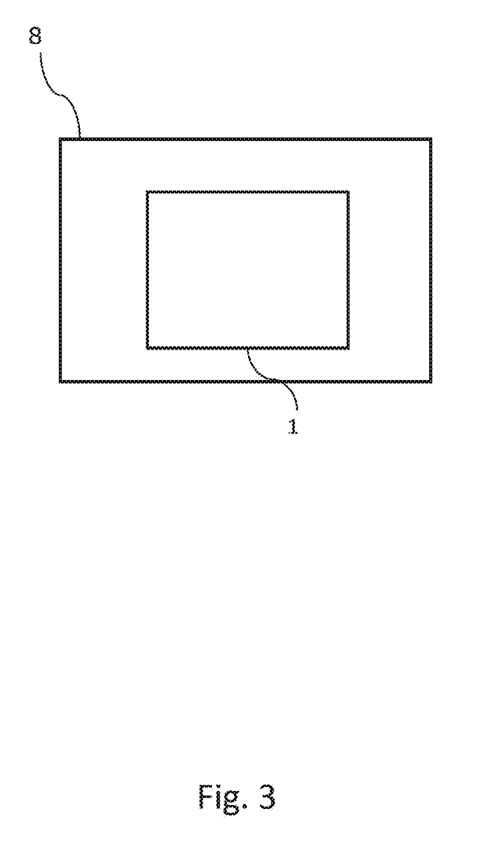
FIG. 3 shows a schematic block diagram of a motor vehicle comprising a radar apparatus according to an embodiment of the present disclosure.

FIG. 3 shows a schematic block diagram of a motor vehicle 8 comprising a radar apparatus 1 according to one of the embodiments described above. Preferably, the motor vehicle may have a number of radar apparatuses 1 according to the present disclosure. As an example, the motor vehicle 8 may be a passenger car or vehicle, a commercial vehicle, a motorcycle, an aircraft or a watercraft.

Figure 4:
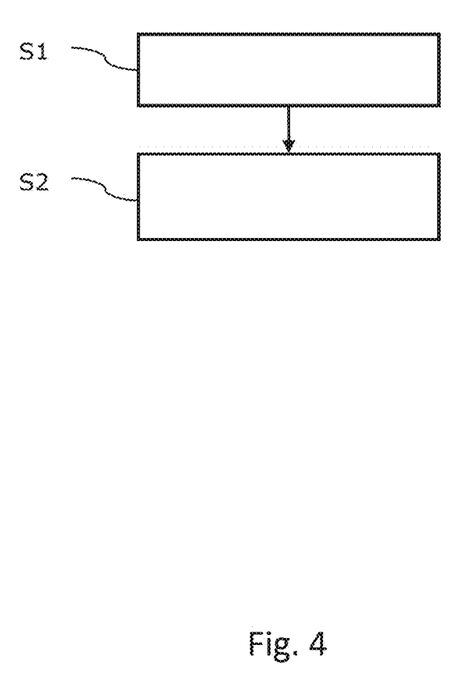
FIG. 4 shows a flow chart of a method for the production of a radar apparatus according to an embodiment of the present disclosure.

FIG. 4 shows a flow chart of a method for manufacturing a radar apparatus 1 according to an embodiment in accordance to the present disclosure.

For this purpose, a transceiver device 2 is provided in a first method step S1. The transceiver device is configured to transmit radar radiation and receive the radar radiation reflected from objects. Depending on the received reflected radar radiation, the transceiver device 2 may generate and output a measurement signal. The transceiver unit 2 may be accommodated in a housing 4. As an example, the transceiver device 2 may have antenna arrays 21 as illustrated in FIGS. 1 and 2 and a radar chip 22 which is electrically coupled to the antenna arrays 21 and which is configured to control the antenna arrays 21.

Furthermore, in a second method step S2, a protective device 3 is formed which protects the transceiver device 2 from external chemical or physical influences, i.e. from direct contact with particles, gases or liquids. In order to form the protective device 3, one or more foils may be attached to the housing 4. The foils may be formed one after the other for this purpose. Alternatively, several foils may be combined in a first step to form a protective device 3, which is then attached to the housing 4.

The housing 4 may be made of metal or have at least one edge area 41 of metal. The protective device 3 may be bonded to the metal edge area 41.

The housing 4 may also be made of plastic material or may have at least one edge area 41 made of plastic material. The protective device 3 may be bonded to the plastic edge area 41. Preferably, the protective device 3 may also be bonded to the plastic edge area 41 by a welding process.

The protective device 3 may be coupled to the housing 4 in such a way that an airtight cavity is formed which protects at least some components of the transceiver device 2 from external influences.

The protective device 3 is selected in the method for manufacturing the radar apparatus 1 in such a way that the thickness of the protective device 3 is at least in sections smaller than 10% of the wavelength of the radar radiation passing through the protective device 3. As an example, the transceiver device 2 may be configured to transmit radar radiation with a frequency of 77 GHz. The protective device 3 may have a permittivity of 2. The thickness of the protective device 3 is selected such that it is less than 0.275 millimeters.

The method of manufacturing may be generally configured to produce any of the radar apparatuses 1 described above.

The following is a list of reference numbers shown in the Figures. However, it should be understood that the use of these terms is for illustrative purposes only with respect to one embodiment. And, use of reference numbers correlating a certain term that is both illustrated in the Figures and present in the claims is not intended to limit the claims to only cover the illustrated embodiment.

LIST OF REFERENCE SIGNS

1 Radar apparatus
2 Transceiver device
3 Protective device
4 Housing
5 Thermally conductive element
6 Cooling element
7 Printed circuit board
8 Motor vehicle
21 Antenna arrays
22 Radar chip
41 Edge area of the housing 4
211 First antenna array
212 Second antenna array While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A radar apparatus for a motor vehicle, the radar apparatus comprising:
   a transceiver device configured to,
      transmit radar radiation,
      receive the radar radiation reflected from objects disposed in an environment of the radar apparatus, and
      generate a measurement signal;
   a radome configured to protect the transceiver device from external influences, wherein at least a section of the radome has a thickness that is less than 10% of a wavelength of the radar radiation passing through the radome; and
   a housing having a lower housing shell that includes a continuous edge area, wherein the transceiver device is arranged inside the housing, and the radome is attached to the edge area of the housing such that the transceiver device is enclosed in the housing to form an airtight condition.

2. The radar apparatus of claim 1, wherein the thickness is less than 0.275 millimeters.

3. The radar apparatus of claim 1, wherein the radome is at least partially formed of plastic material.

4. The radar apparatus of claim 1, wherein the housing is at least partially made of plastic and the radome is bonded or welded to the housing.

5. The radar apparatus of claim 1, wherein the housing is at least partially made of metal and the radome is bonded to the housing.

6. The radar apparatus of claim 1, wherein the radome includes at least one foil arranged in a beam path of the transceiver device.

7. A motor vehicle comprising:
   a radar apparatus provided with a transceiver device configured to,
      transmit radar radiation,
      receive the radar radiation reflected from objects disposed in an environment of the radar apparatus, and
      generate a measurement signal;
   a radome configured to protect the transceiver device from external influences, wherein at least a section of the radome has a thickness that is less than 10% of a wavelength of the radar radiation passing through the radome; and
   a housing having a lower housing shell that includes a continuous edge area, wherein the transceiver device is arranged inside the housing, and the radome is attached to the edge area of the housing such that the transceiver device is enclosed in the housing to form an airtight condition.

8. The motor vehicle of claim 7, wherein the radome is formed of a foil layer.

9. The motor vehicle of claim 8, wherein the foil layer is opaque.

10. The motor vehicle of claim 8, wherein the foil layer is formed of a non-conductive material.

11. The motor vehicle of claim 7, wherein the transceiver device is configured to transmit radar radiation at a frequency of 77 GHz or 24 GHz.

12. The motor vehicle of claim 7, wherein the external influences include particles, gases or liquids.

13. A radar apparatus for a motor vehicle, the radar apparatus comprising:
   a transceiver device configured to (i) transmit radar radiation, (ii) receive the radar radiation reflected from objects in an environment of the radar apparatus, and (iii) generate a measurement signal;
   a housing that receives the transceiver device, wherein the housing is open in a direction of a beam path of the transceiver device; and
   a radome configured to protect the transceiver device from external influences, wherein the radome includes at least one foil arranged in the beam path, wherein a cross section of the housing is completely covered by the radome, and at least a section of the radome has a thickness that is less than 10% of a wavelength of the radar radiation passing through the radome.

* * * * *